US007092563B2

(12) United States Patent
Shiratani

(10) Patent No.: US 7,092,563 B2
(45) Date of Patent: Aug. 15, 2006

(54) THREE-DIMENSIONAL INFORMATION ACQUISITION APPARATUS AND THREE-DIMENSIONAL INFORMATION ACQUISITION METHOD

(75) Inventor: Fumiyuki Shiratani, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 768 days.

(21) Appl. No.: 10/179,494

(22) Filed: Jun. 24, 2002

(65) Prior Publication Data

US 2002/0196415 A1  Dec. 26, 2002

(30) Foreign Application Priority Data

Jun. 26, 2001 (JP) ............... 2001-193555
Apr. 30, 2002 (JP) ............... 2002-128905

(51) Int. Cl.
*G06K 9/00* (2006.01)
(52) U.S. Cl. ............... 382/154; 345/419; 353/31; 356/603; 356/610; 382/106; 382/203
(58) Field of Classification Search ............... 345/419, 345/420; 356/603, 623, 610; 382/154, 195, 382/203, 106; 353/31
See application file for complete search history.

(56) References Cited

U.S. PATENT DOCUMENTS

| 4,687,326 | A | * | 8/1987 | Corby, Jr. ............ 356/5.01 |
| 5,307,151 | A | * | 4/1994 | Hof et al. ............ 356/604 |
| 5,432,543 | A | * | 7/1995 | Hasegawa et al. ....... 348/45 |
| 6,064,423 | A | * | 5/2000 | Geng ................. 348/36 |
| 6,078,307 | A | * | 6/2000 | Daly ................. 345/600 |
| 6,341,016 | B1 | * | 1/2002 | Malione .............. 356/603 |
| 6,421,629 | B1 | * | 7/2002 | Ishiyama ............. 702/159 |
| 6,438,272 | B1 | * | 8/2002 | Huang et al. ......... 382/286 |
| 6,445,814 | B1 | * | 9/2002 | Iijima et al. ........ 382/154 |
| 6,493,095 | B1 | * | 12/2002 | Song et al. .......... 356/603 |
| 6,509,559 | B1 | * | 1/2003 | Ulrich et al. ........ 250/237 G |
| 6,538,751 | B1 | * | 3/2003 | Ono ................. 356/614 |

(Continued)

FOREIGN PATENT DOCUMENTS

EP     1217328 A1 *  6/2002

OTHER PUBLICATIONS

Japan Society for Precision Engineering Journal, vol. 62, No. 6, pp. 830-834, 1996.

(Continued)

*Primary Examiner*—Matthew C. Bella
*Assistant Examiner*—Gregory Desire
(74) *Attorney, Agent, or Firm*—Frishauf, Holtz, Goodman & Chick, P.C.

(57) ABSTRACT

There are performed three types of object shooting, i.e., a projection pattern shooting using a pattern including both characterization of a stripe based on a color and characterization based on a gradation of the same component, a flash shooting without a pattern and a non-flash shooting without a pattern. A two-dimensional image information generation portion corrects the influence of a surface reflectivity of an object or external light from the three types of images, and estimates a pattern structure using the characteristic based on a color with respect to an object having a white-based color or a low-saturation color and based on a gradation with respect to an object having a high-saturation color. A depth calculation portion specifies the correspondence relationship between the estimated pattern structure and information of the projected pattern, and calculates a depth of each part of the object based on a result of specification.

23 Claims, 8 Drawing Sheets

U.S. PATENT DOCUMENTS

| | | | |
|---|---|---|---|
| 6,542,250 B1* | 4/2003 | Michaelis et al. | 356/601 |
| 6,559,954 B1* | 5/2003 | Takata et al. | 356/604 |
| 6,618,123 B1* | 9/2003 | Uomori et al. | 356/3.12 |
| 6,668,078 B1* | 12/2003 | Bolle et al. | 382/164 |
| 6,700,669 B1* | 3/2004 | Geng | 356/603 |
| 6,724,490 B1* | 4/2004 | Ono | 356/614 |
| 6,750,975 B1* | 6/2004 | Takeda et al. | 356/604 |
| 6,823,080 B1* | 11/2004 | Iijima et al. | 382/154 |
| 6,853,458 B1* | 2/2005 | Yahashi et al. | 356/604 |
| 6,864,903 B1* | 3/2005 | Suzuki | 715/757 |
| 6,914,685 B1* | 7/2005 | Chang | 356/610 |
| 6,930,704 B1* | 8/2005 | Hamada | 348/42 |
| 6,937,348 B1* | 8/2005 | Geng | 356/603 |
| 7,013,040 B1* | 3/2006 | Shiratani | 382/154 |
| 2002/0196415 A1* | 12/2002 | Shiratani | 353/31 |

OTHER PUBLICATIONS

Institute of Electronics, Information and Communication Engineers Journal, vol. J61-D, No. 6, pp. 411-418, 1978.

* cited by examiner

THREE-DIMENSIONAL INFORMATION ACQUISITION APPARATUS AND THREE-DIMENSIONAL INFORMATION ACQUISITION METHOD

CROSS-REFERENCE TO RELATED APPLICATIONS

This application is based upon and claims the benefit of priority from the prior Japanese Patent Applications No. 2001-193555, filed Jun. 26, 2001; and No. 2002-128905, filed Apr. 30, 2002, the entire contents of both of which are incorporated herein by reference.

BACKGROUND OF THE INVENTION

1. Field of the Invention

The present invention relates to a three-dimensional information acquisition apparatus capable of acquiring a depth value by projecting a pattern on a object and obtaining the correspondence between a light receiving pattern and a light projection pattern in order to measure a three-dimensional shape, a projection pattern in such three-dimensional information acquisition, and a three-dimensional information acquisition method.

2. Description of the Related Art

As conventional methods for measuring the shape of a three-dimensional object, there are roughly two types of methods. One is a method based on measurement of a light propagation time, and the other one is a method which utilizes the principle of triangulation. The former has no blind spot and is an ideal method in principle. Under the present situation, however, there is a problem in measurement time and accuracy, and the latter triangulation method is mainly used.

As the method utilizing triangulation, there are an active method and a passive stereo method.

The passive stereo method corresponds features in the image obtained from two cameras provided at different positions with each other, and obtains a distance to an object based on the principle of triangulation from the previously measured positional relationship between the two cameras. This method has drawbacks that the correspondence of features in the images is difficult and the shape of an object having no texture cannot be obtained.

On the other hand, as the active method utilizing the principle of triangulation, there is a light projection method which measures a shape by substituting a light source for one of the two cameras and observing an image of the light source on a surface of an object by the other camera which is set as a view point. This light projection method can be further classified into a spot light projection method, a slit light projection method and a pattern light projection method.

In the spot light projection method, only one point of an object can be measured by one input of an image.

In the slit light projection method, although one line of an object can be measured by one input of an image, input of an image must be repeated many times while deflecting the projected light in order to measure a shape of a gamut of the object, which takes time for input.

The pattern light projection method projects a two-dimensional pattern such as a stripe pattern or a grating pattern onto an object, and has the merit that measurement can be carried out in a short time since a number of times of input of the pattern projection image is small.

This pattern light projection method is also called spatial coding, and this is further classified into pattern form coding and gradation coding.

As the former pattern form coding, one based on distribution of an opening width of the slit and that based on utilization of an M sequence code are proposed, but they have a problem in measurement density and measurement stability. It is said that they serve no practical use.

On the other hand, as the latter gradation coding, there is one based on light and shade and one based on colors.

At first, as to coding based on light and shade, there is well known a time-series spatial coding method using a binary pattern, which performs projection while doubly varying a lighting pitch of a pattern. This method has an excellent characteristic. For example, a coding error due to displacement or noise can be suppressed to ±1. In order to obtain the same resolution as N slight light rays, projecting binary patterns for $\log_2 N$ times can suffice. For example, the same resolution as 128 slit images can be realized by projecting seven binary patterns.

In the time-series coding using the binary pattern, however, sufficient measurement cannot be taken when the camera is not fixed on a tripod but held in the hand or when an object such as a human being or an animal cannot stay still. That is because the shooting cannot be finished within a time which can allow a camera shake or blurring of an object if a number of times of projection is large. Further, there is also a restriction in flash charging time or the quantity of light emission, and the number of times of projection which can satisfy such a restriction is not enough.

Therefore, in order to reduce a number of times of projection of a pattern, changing a binary pattern to a multi-value pattern can be considered. For example, this is proposed in Japan Society for Precision Engineering Journal, vol. 62, No. 6, pp. 830–834, 1996. In this proposition, a difference in brightness in respective pixels of an image taken with flash and an image taken without flash is divided by a number of gradations, and the multi-gradation is judged based on which section a brightness value at the time of creation is included in.

Therefore, when there is non-linearity such as a gamma characteristic in an acquired image, a decoding error is apt to occur in an area where a difference in reflection brightness is small, and stable measurement under regular illumination is difficult. Further, the measurement result is affected by, e.g., the color of the surface of the object. In order to solve these problems, reference projection or the like is proposed in the above cited reference, but this is not realistic because the number of times of projection is increased. As described above, coding using the multi-gradation of brightness is easily affected by fluctuations in brightness, and hence setting an appropriate threshold value is difficult.

On the other hand, for example, Institute of Electronics, Information and Communication Engineers Journal, vol. J61-D, No. 6, pp. 411–418, 1978 proposes coding using colors. FIG. 1 shows an example of a stripe pattern coded by using colors of R, G and B. It is designed to reduce mixed color resulting from diffusion of light by providing an area of black, which is on a minimum brightness level, between R, G and B.

A flow of processing in the conventional color pattern projection method using colors is as follows.

At first, a coded color pattern such as shown in FIG. 1 is projected onto an object, and image data (Pr, Pg, Pb) obtained by shooting this projection pattern are obtained.

Subsequently, a stripe structure (local maximum and local minimum positions of Pr, Pg and Pb) is detected from the image data. Then, a color at the time of emitting the stripe is specified with respect to each stripe by using a component which is maximum in Pr, Pg and Pb.

Thereafter, a code sequence (alignment of colors) of the received stripe is written, and each code number of the received code sequence and a code number of the code sequence when emitting the pattern, including the arrangement relationship in the code sequence, are matched. As a result, the pattern emission position and the reflected light reception position can be uniquely associated with each other, and the principle of the triangulation is applied to this association, thereby calculating a depth value.

Then, a three-dimensional image is generated from the obtained depth value and the picturized two-dimensional image information.

The conventional color pattern projection method using colors carries out the above-described processing.

In the prior art color pattern projection method using colors, however, it is difficult to measure a three-dimensional shape of an object which has a high-saturation color in particular. This will now be described with reference to FIG. 1.

For example, although one local maximum signal can be obtained in a brightness value of an R component with respect to an object having such a surface reflectivity characteristic as that a reflection signal of the R component is strong (that is, a high-saturation red object such as an apple), the brightness values of a G component and a B component are almost on the noise level. Under such a circumstance, even the stripe structures of the G component and the B component cannot be extracted, and the stripe cannot be specified. That is, decoding is difficult with respect to an object having such a surface reflectivity characteristic as that even one of R, G and B components has a reflection signal which is close to zero. In other words, decoding can be successfully performed with respect to a surface of an object which has a white color or a low-saturation color, but judgment based on colors obtained from combinations of R, G and B becomes difficult with respect to an object having such a surface reflectivity characteristic as that even one of reflection signals of the R, G and B components has a value on the noise level close to zero.

Incidentally, although the above has described the example of the stripe pattern, the same is true of a grating pattern or the like.

BRIEF SUMMARY OF THE INVENTION

In view of the above-described drawbacks, it is an object of the present invention to provide a three-dimensional information acquisition apparatus which enables correct decoding from a projection image of a coded pattern with respect to an object having high-saturation colors as well as that having white or low-saturation colors, a projection pattern in three-dimensional information acquisition, and a three-dimensional information acquisition method.

According to a first aspect of the present invention, there is provided a three-dimensional information acquisition apparatus which shoots a shooting object on which a predetermined projection pattern in which patterns of a plurality of color components overlap is projected at a position away from a shooting unit by a predetermined distance by the shooting unit, and analyses an image shot by the shooting unit, thereby obtaining three-dimensional information of the shooting object, comprising:

an image memory which receives from the shooting unit a first image obtained by shooting the shooting object illuminated with light from a light source, a second image obtained by shooting the shooting object without performing illumination of the light from the light source by one of turning off the light source and preventing transmission of the light from the light source, and a third image obtained by shooting the shooting object on which the projection pattern is projected by utilizing one of the light from the light source and light from any other light source having the same characteristic as that of the light source, and stores them therein;

a pattern memory which stores therein the projection pattern to be projected onto the shooting object in advance;

a pattern structure estimation portion which corrects the influence of a surface reflectivity of the shooting object and external light by utilizing the first, second and third images stored in the image memory, and estimates a structure of the shot pattern based on at least one of a color and a gradation of each portion of the pattern obtained by performing the correction; and a depth calculation portion which specifies the correspondence relationship between a result of the estimation obtained by the pattern structure estimation portion and the projection pattern stored in the pattern memory, and calculates a depth value of the shooting object based on a result of specification of the correspondence relationship.

According to a second aspect of the present invention, there is provided a three-dimensional information acquisition apparatus which shoots a shooting object on which a predetermined projection pattern in which patterns of a plurality of color components overlap is projected at a position away from a shooting unit by a predetermined distance by the shooting unit, and analyses an image shot by the shooting unit, thereby acquiring three-dimensional information of the shooting object, comprising:

an image memory which receives from the shooting unit a first image obtained by shooting the shooting object illuminated with light from a light source and a second image obtained by shooting the shooting object on which the projection pattern is projected by utilizing one of the light from the light source and light from any other light source having the same characteristic as that of the light source, and stores them therein;

a pattern memory which stores the projection pattern projected on the shooting object in advance;

a pattern structure estimation portion which corrects the influence of a surface reflectivity of the shooting object by utilizing the first and second images stored in the image memory, and estimates a structure of a shot pattern based on at least one of a color and a gradation of each portion of the pattern obtained by performing the correction; and a depth calculation portion which specifies the correspondence relationship between a result of the estimation obtained by the pattern structure estimation portion and the projection pattern stored in the pattern memory, and calculates a depth value of the shooting object by utilizing a result of specification of the correspondence relationship.

According to a third aspect of the present invention, there is provided a three-dimensional information acquisition apparatus which shoots a shooting object on which a predetermined projection pattern in which patterns of a plurality of color components overlap is projected at a position away from a shooting unit by a predetermined distance by the shooting unit, and analyses an image shot by the shooting unit, thereby acquiring three-dimensional information of the shooting object, comprising:

an image memory which receives an image obtained by shooting the shooting object on which the projection pattern is projected from the shooting unit and stores it therein;

a pattern memory which stores therein the projection pattern to be projected on the shooting object in advance;

a pattern structure estimation portion which selectively executes a first estimation method which estimates a structure of the shot pattern based on a color of the shot pattern included in the image and a second estimation method which estimates a structure of the shot pattern based on a gradation of at least one color component which is not all color components; and a depth calculation portion which specifies the correspondence relationship between a result of estimation obtained by one of the first and second estimation methods in the pattern structure estimation portion and the projection pattern stored in the pattern memory, and calculates a depth value of the shooting object by utilizing a result of specifying the correspondence relationship.

According to a fourth aspect of the present invention, there is provided a projection pattern which is projected onto a shooting object when analyzing an image obtained by shooting the shooting object and acquiring three-dimensional information of the shooting object, the project pattern being obtained by overlapping patterns of a plurality of color components; and the projection pattern including a plurality of areas having different chromatic colors, wherein the areas having chromatic colors are composed of combinations of areas each having a predetermined gradation of the pattern of each color component, a gradation of an arbitrary area in a pattern of one color component is different from a gradation of an arbitrary area in a pattern of another color component, and the projection pattern is thereby coded so as to be capable of specifying an area in the projection pattern to which the arbitrary area corresponds.

According to a fifth aspect of the present invention, there is provided a three-dimensional information acquisition method which shoots by using a shooting unit a shooting object on which a predetermined projection pattern in which patterns of a plurality of color components overlap is projected at a position away from the shooting unit by a predetermined distance, and analyses an image shot by the shooting unit, thereby acquiring three-dimensional information of the shooting object, comprising:

obtaining a first image by shooting the shooting object illuminated with light from a light source;

obtaining a second image by shooting the shooting object without performing illumination using the light from the light source by one of turning off the light source and preventing transmission of the light from the light source;

obtaining a third image by shooting the shooting object on which the projection pattern is projected by utilizing one of the light from the light source and light from any other light source having the same characteristic as that of the light source;

correcting the influence of a surface reflectivity of the shooting object and external light by utilizing the first, second and third images, and estimating a structure of a shot pattern based on at least one of a color and a gradation of each portion of the pattern obtained by performing the correction;

specifying the correspondence relationship between a result of the estimation and the projected predetermined projection pattern; and calculating a depth value of the shooting object based on a result of specifying the correspondence relationship.

According to a sixth aspect of the present invention, there is provided a three-dimensional information acquisition method which shoots by using a shooting unit a shooting object on which a predetermined projection pattern in which patterns of a plurality of color components overlap is projected at a position away from the shooting unit by a predetermined distance, and analyses an image shot by the shooting unit, thereby acquiring three-dimensional information of the shooting object, comprising:

obtaining a first image by shooting the shooting object illuminated with light from a light source;

obtaining a second image by shooting the shooting object on which the projection pattern is projected by utilizing one of the light from the light source and light from any other light source having the same characteristic as that of the light source;

correcting the influence of a surface reflectivity of the shooting object by utilizing the first and second images, and estimating a structure of a shot pattern based on at least one of a color and a gradation of each portion in the pattern obtained by performing the correction;

specifying the correspondence relationship between a result of the estimation and the projected predetermined projection pattern; and calculating a depth value of the shooting object by utilizing a result of specifying the correspondence relationship.

According to a seventh aspect of the present invention, there is provided a three-dimensional information acquisition method which shoots by using a shooting unit a shooting object on which a predetermined projection pattern in which patterns of a plurality of color components overlap is projected at a position away from the shooting unit by a predetermined distance, and analyses an image shot by the shooting unit, thereby acquiring three-dimensional information of the shooting object, comprising:

obtaining an image by shooting the shooting object on which the projection pattern is projected;

selectively executing a first estimation method which estimates a structure of a shot pattern based on a color of the shot pattern included in the image and a second estimation method which estimates a structure of the shot pattern based on a gradation of at least one color component which is not all color components;

specifying the correspondence relationship between a result of estimation by one of the first and second estimation methods and the projected predetermined projection pattern; and calculating a depth value of the shooting object by utilizing a result of specifying the correspondence relationship.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments according to the present invention will now be described with reference to the accompanying drawings.

FIRST EMBODIMENT

Figure 2:
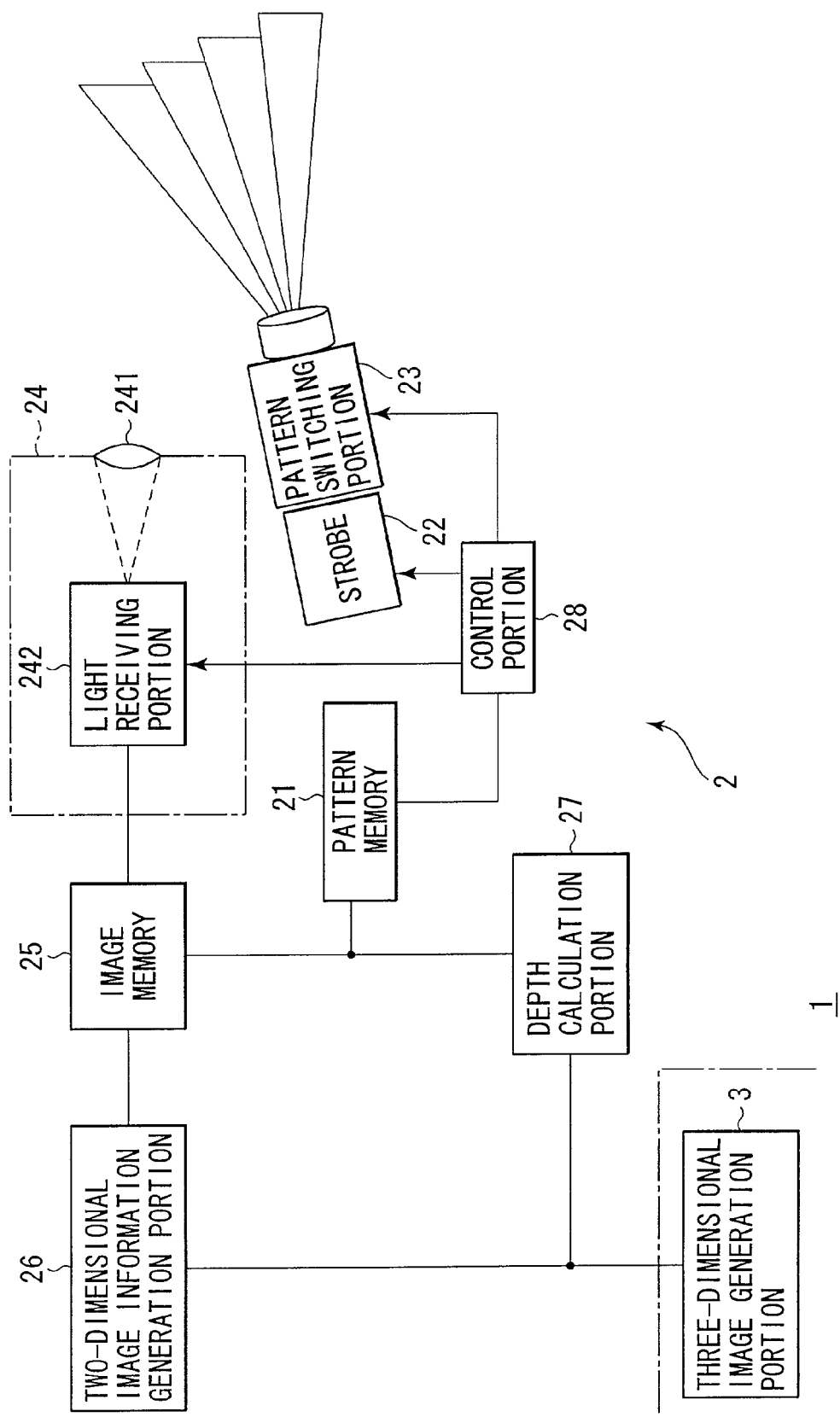
FIG. 2 is a block diagram showing a three-dimensional shape measurement apparatus to which a three-dimensional information acquisition apparatus according to a first embodiment of the present invention is applied.

FIG. 2 is a view showing a structure of a three-dimensional shape measurement apparatus 1 to which a three-dimensional information acquisition apparatus according to a first embodiment of the present invention is applied.

This three-dimensional shape measurement apparatus 1 is constituted by a three-dimensional information acquisition apparatus 2 according to a first embodiment of the present invention and a three-dimensional image generation portion 3. The three-dimensional information acquisition apparatus 2 is configured by a pattern memory 21, a strobe 22, a pattern switching portion 23, a shooting portion 24, an image memory 25, a two-dimensional image information generation portion 26, a depth calculation portion 27 and a control portion 28.

Here, the pattern memory 21 stores therein a code sequence or the like of a projection pattern to be projected onto an object (not shown). The strobe 22 is used for emitting the light, and the pattern switching portion 23 switches presence/absence of the projection pattern which modulates the intensity (light transmissivity) of the strobe light from the strobe 22 depending on a position. The shooting portion 24 includes of a condenser lens 241 which condenses the reflected light from the object, and a light receiving portion (image pickup element) 242 which receives the light condensed by the condenser lens 241. The image memory 25 stores therein an image taken by the shooting portion 24. The two-dimensional image information generation portion 26 includes a function to estimate a structure of a pattern taken from an image stored in the memory 25 and store a result of estimation in the image memory 25 as well as a function to generate two-dimensional image information from an image stored in the image memory 25. The depth calculation portion 27 calculates a depth value from the result of estimation stored in the image memory 25 and a projection pattern stored in the pattern memory 21. The control portion 28 carries out the light emission control of the strobe 22, the projection pattern presence/absence switching control of the pattern switching portion 23, the light reception control of the light receiving portion 242 or the like.

It is to be noted that the pattern switching portion 23 is constituted by a transmission type liquid crystal apparatus and the switching control is performed by display or non-display of an image according to a projection pattern stored in the pattern memory 21 on the transmission type liquid crystal apparatus by the control portion 28. Alternatively, the pattern switching portion 23 may be configured as a mechanism which mechanically moves forward or backward a film on which a pattern similar to the projection pattern stored in the pattern memory 21 on a light path of the strobe 22, and this movement may be controlled by the control portion 28. In addition, the film may be moved forward or backward on the strobe light path manually by an operator instead of being mechanically moved forward or backward. In this case, although the control portion 28 does not directly control the pattern switching portion 23, it is preferable to form the structure which directs such a movement to an operator by a non-illustrated indicator or a buzzer or, contrarily, judges an operation of a non-illustrated operation portion used for directing the control portion 28 to terminate the operation for moving the film by the operator after this operation, for example.

Additionally, the three-dimensional image generation portion 3 generates a three-dimensional image from the two-dimensional image information generated by the two-dimensional image information generation portion 26 and a depth value calculated by the depth calculation portion 27.

The operation of the three-dimensional shape measurement apparatus 1 having such a structure will now be described.

Code information of the projection pattern is stored in the pattern memory 21 in advance. Further, the control portion 28 first reads the pattern code information from the pattern memory 21, displays a pattern according to the pattern code information on the pattern switching portion 23, and causes the strobe 22 to emit the light, thereby projecting the flash with the pattern according to the pattern code information, namely, the projection pattern onto an object (not shown). At this moment, the reflected light from the object is condensed by the condenser lens 241 and led to the light receiving portion 242. Therefore, the control portion 28 causes the light receiving portion 242 to operate in synchronization with light emission of the strobe 22, and stores an image obtained by the light receiving portion 242 in the image memory 25.

Subsequently, the control portion 28 eliminates the pattern display on the pattern switching portion 23, and then controls the strobe 22 and the light receiving portion 242. Consequently, the flash emission take without a pattern is carried out by controlling the strobe 22 and the light receiving portion 242 as similar to the above, and an obtained image is stored in the image memory 25.

Furthermore, the non-flash emission shooting without a pattern is carried out, and an obtained image is stored in the image memory 25.

After obtaining three types of images, the two-dimensional image information generation portion 26 extracts pattern information indicative of a structure of the taken pattern from the three types of images stored in the image memory 25 and writes it into the image memory 25. The detail of this extraction method will be described later. It is to be noted that the two-dimensional image generation portion 26 is configured to read the flash image without a pattern from the image memory 25 and generate planar picture information (two-dimensional image information) anytime.

Then, in the depth calculation portion 27, the code information of the projection pattern stored in the pattern memory 21 is compared and collated with the pattern information written in the image memory 25 and extracted from the two-dimensional image information generation portion 26, and the correspondence relationship between the projected pattern and the shot pattern is determined. Subsequently, an incidence angle is calculated based on a reflection pattern light reception position and information of a focal distance, and a depth value is calculated from information of a distance between the projection pattern emission point and the light reception point of the pattern reflected from the object and that of a light emission angle based on the principle of triangulation.

At last, in the three-dimensional image generation portion 3, a three-dimensional image is generated from the two-dimensional image information generated by the two-dimensional image information generation portion 26 and the depth value calculated by the depth calculation portion 27.

The projected pattern will now be described with reference to FIG. 3.

Figure 3:
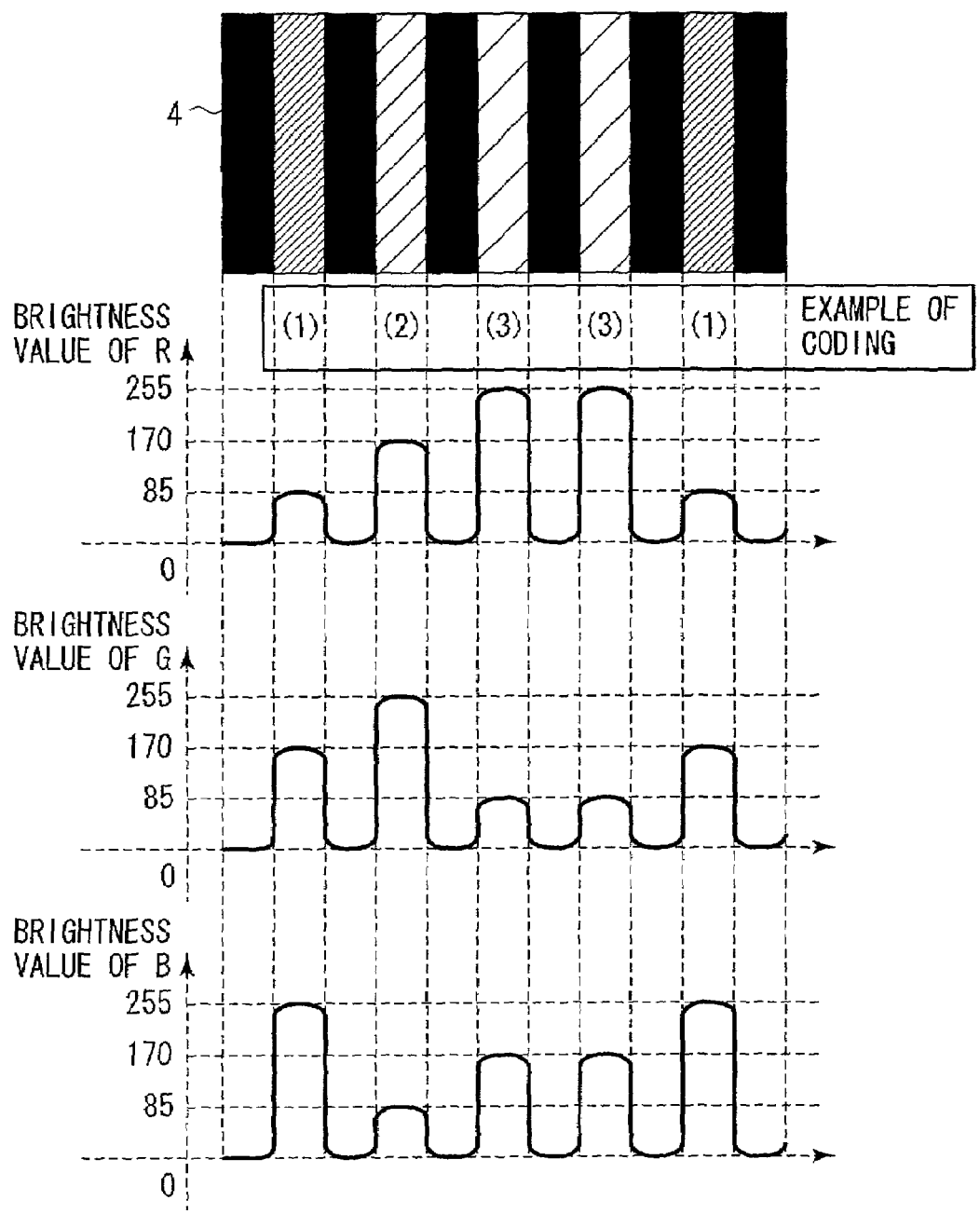
FIG. 3 is a view showing an example of a pattern projected onto an object in the first embodiment.

FIG. 3 shows a coded color pattern 4 projected onto the object in accordance with the code information stored in the pattern memory 21, and respective brightness values (gradation values) of the R, G and B components are shown under the color pattern 4. Incidentally, the example in FIG. 3 is a stripe pattern, a grating pattern can be of course used.

In this pattern structure, the local maximum (chromatic color) and the local minimum (black) are alternately arranged with respect to each component of R, G and B, and the code numbers used for identifying the stripe of the pattern are represented as (1), (2) and (3) in the drawing. Here, representing the respective components of R, G and B to which the code number k is allocated as r[k], g[k] and b[k], values of R, G and B of the respective code numbers can be expressed by the following formula in the example of FIG. 3. Incidentally, these values can be obtained when R, G and B respectively have 256 gradations.

$$(r[1], g[1], b[1])=(85, 170, 255)$$

$$(r[2], g[2], b[2])=(170, 255, 85)$$

$$(r[3], g[3], b[3])=(255, 85, 170)$$

This example is a coding pattern having a characteristic described below.

Uniquely associating the stripe in the received pattern with the stripe in the pattern during emission by utilizing the alignment of the code numbers is the same as the prior art, but the present embodiment has features in characterization of the stripe.

The first characterization is characterization of the stripe by using the relationship between different components in the same stripe, e.g., largeness/smallness of the stripe, the ratio of sizes of the stripes, the hue or the like. This characterization using colors in the same stripe is a coding method which can specify the code number of the stripe by using, e.g., the following relationship.

$$0<<r[1]<<g[1]<<b[1]$$

$$0<<b[2]<<r[2]<<g[2]$$

$$0<<g[3]<<b[3]<<r[3]$$

Here, the symbol << indicates that the right hand side is sufficiently larger than the left hand side so that inversion of the relationship in largeness due to the influence of the noise does not occur.

The second characterization is characterization of the stripe by using the relationship in largeness of the same component between the different stripes. This characterization using the gradation (brightness) of the same component is a coding method which can specify the code number of the stripe by using the relationship of the following expression.

$$0<<r[1]<<r[2]<<r[3]$$

$$0<<g[3]<<g[1]<<g[2]$$

$$0<<b[2]<<b[3]<<b[1]$$

Using the coding patterns having these two characteristics included in one pattern is the feature of this embodiment.

Further, the coding patterns having these two characteristics included therein are discriminated and used in such a manner that a color of the stripe (code number) during pattern emission is specified with respect to an object of a white-based color or a low-saturation color which reflects all the three components of R, G and B by the characteristic of color which is the above-described first characteristic and a color of the stripe at the time of pattern emission is specified with respect to an object of a high-saturation color which reflects one or two of R, G and B components by the characteristic of the gradation of the same component which is the above-described second characteristic.

It is to be noted that the merit of adopting the method which specifies the stripe in pattern emission by using the characteristic of color such as a hue on an object having a white-based color or a low-saturation color which reflects all of the three components of R, G and B can be explained as follows. Consideration is given by mapping the three components of R, G and B to an HSV space consisting of a hue H, a saturation S, a value of color V. As a conversion expression, the following expression is known $$H=\arctan\{(G-B)/(2R-G-B)\}$$

$$S=\{(B-R)^2+(R-G)^2+(G-B)^2\}/3$$

$$V=R+G+B$$

It is assumed that values of R, G and B are respectively multiplied by k. At this moment, the saturation S is $k^2$-fold and the value of color V is k-fold, but the hue remains unchanged. That is, assuming that the brightness values of the respective components all become constant-fold in accordance with each local area, the method of judging the hue is not affected by this situation, but the judgment method based on the gradation of brightness is largely influenced. Incidentally, this is almost true to conversion to the uniform color space (HCV) instead of HSV space.

Meanwhile, when the code number is allocated to the stripe, in order to uniquely specify each stripe with respect to alignment of the stripes, this embodiment generates a code sequence (alignment of codes) such that the alignment of the code numbers of chromatic stripes which are adjacent to each other with a black stripe which corresponds to the lowest gradation level (minimum brightness level) sandwiched therebetween is unique.

For example, when color numbers (types of codes) of three colors are used, considering a combination of chromatic stripes (allowing the same colors) which are adjacent to each other with the black stripe sandwiched therebetween, there is generated a code sequence of (1) (2) (2) (3) (1) (3) (3) (2) (1). If a longer code sequence is required, the color numbers are increased to four or five. Alternatively, it is good enough to adopt a code sequence such that a combination of colors of three or four stripes (code numbers), in place of a combination of two stripes, becomes unique.

Such a coding pattern including the two characteristics can be of course utilized for the conventionally known detection method between the stripes, but it can demonstrate a further advantage when combined with an apparatus such as described in this embodiment.

Figure 4:
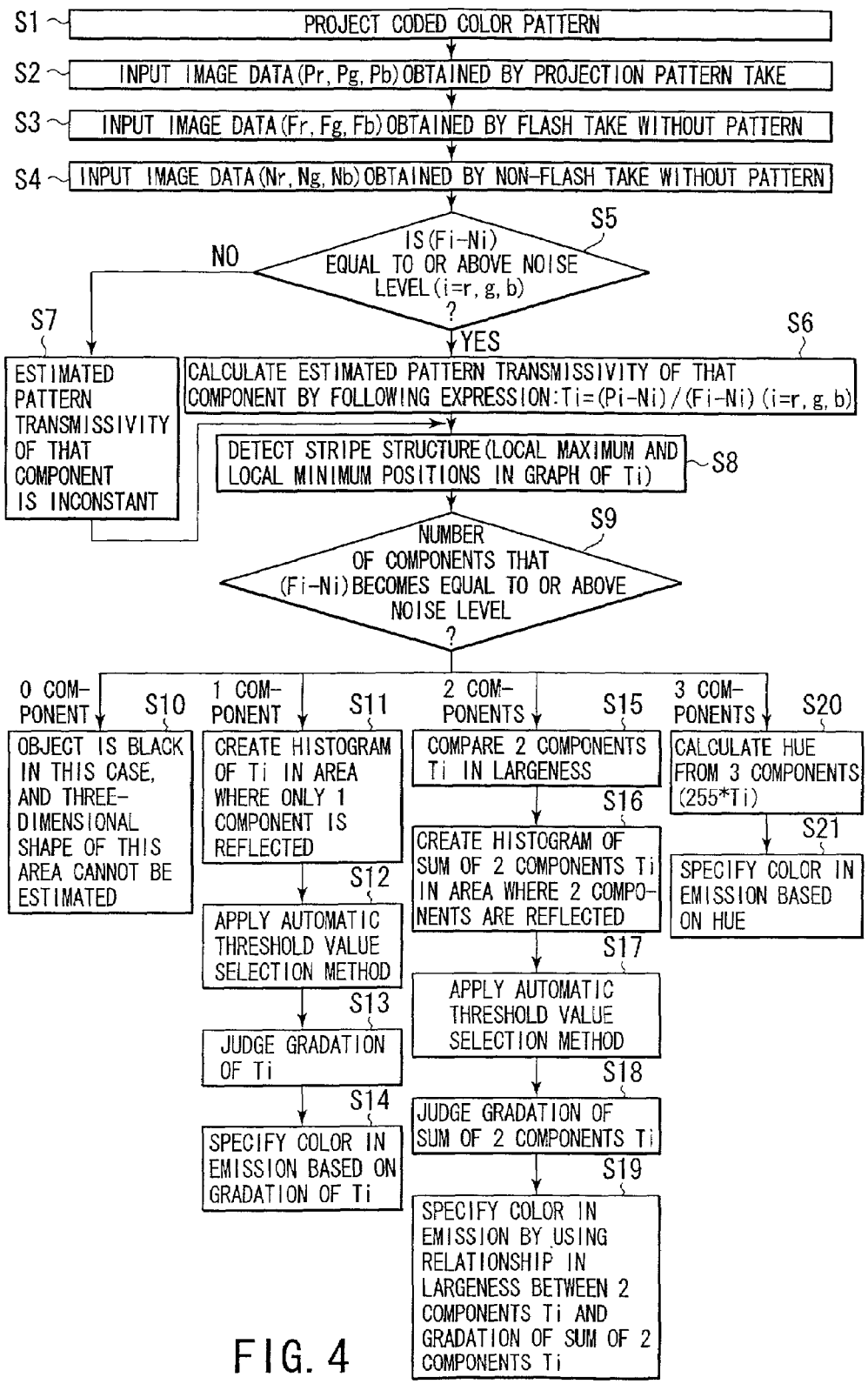
FIG. 4 is a view showing a flowchart for illustrating a flow until a color at the time of emission is specified in image processing in the first embodiment.

A flow of image processing will now be described with reference to FIG. 4.

A coded color pattern 4 is projected onto an object (step S1). Then, the projected pattern is shot, and the obtained image data (Pr, Pg and Pb) is input to the image memory 25 (step S2).

Subsequently, the flash shooting without a pattern is performed, and the image data (Fr, Fg and Fb) is input to the image memory 25 (step S3).

Then, the non-flash shooting without a pattern is carried out, and its image data (Nr, Ng and Nb) is input to the image memory 25 (step S4). A series of processing from the step S1 to S4 is instantaneously performed, input of necessary information is completed.

Thereafter, in the two-dimensional image information generation portion 26, the pattern stripe structure is extracted from the information input to the image memory 25, a color in the stripe emission is specified with respect to each stripe, and decoding processing is conducted. Such processing will now be described hereinafter in detail.

Figure 5:
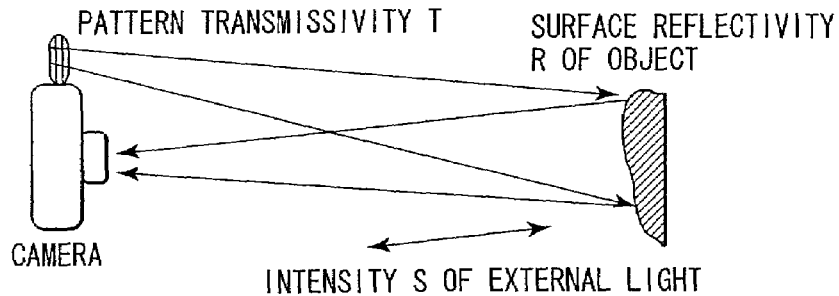
FIG. 5 is a view for illustrating various parameters during the shooting in the first embodiment.

At first, the influence of external like or a difference in surface reflectivity characteristic of an object is eliminated from a pattern image, and processing for estimating the pattern during emission is carried out. Here, the relational expression required for this processing will now be described with reference to FIG. 5. As shown in FIG. 5, assuming that the light projection intensity of flash is L, the transmissivity of the pattern is T, the surface reflectivity of the object is R and the intensity of external light is S, they are considered as functions of each pixel of a received image. Here, approximately considering that a light ray emitted from the pattern switching portion 23 and a light ray entering the light receiving portion 242 can be described in the one-to-one relationship ignoring diffusion of the light or the like, it is possible to describe as follows:

$$P=R(TL+S)$$

$$F=R(L+S)$$

$$N=RS$$

where P is pixel intensity of an image obtained by the projection pattern shooting, F is pixel intensity of an image obtained by the flash shooting and N is pixel intensity of an image obtained by non-flash shooting. When T is solved by simultaneously realizing these three expressions, the following can be obtained:

$$T=(P-N)/(F-N)$$

For example, when the pixel intensity values can be obtained with respect to three components of R, G and B, approximately considering that R, G and B are independent from each other, the estimated pattern transmissivities Tr, Tg and Tb relative to R, G and B can be obtained by the following expressions:

$$Tr=(Pr-Nr)/(Fr-Nr)$$

$$Tg=(Pg-Ng)/(Fg-Ng)$$

$$Tb=(Pb-Nb)/(Fb-Nb)$$

However, in order to cope with the influence of noise or the like, if the denominator is close to zero, consideration must be given eliminating that component.

Again referring to FIG. 4, description of the flow of image processing will be restarted.

That is, at a step S5, judgment is made upon whether the denominator in the above expression, i.e., (Fi-Ni) (where i=r, g and b) is equal to or above a preset noise level. If it is equal to or above the noise level, the estimated pattern transmissivity Ti of that component is calculated by using the above expressions (step S6). On the contrary, if it is less than the noise level, the estimated pattern transmissivity of that component is determined as being inconstant, and a value which does not affect the subsequent processing is input (step S7).

Subsequently, the stripe structure of the pattern (local maximum and local minimum positions in the graph of Ti) is detected (step S8). In order to perform this detection, edge portions of the stripe are extracted by using, e.g., a Sobel filter, and judgment is made upon whether the intensity of Ti becomes local maximum or local minimum in a section sandwiched between the edges. Since the estimated pattern transmissivity Ti is used in place of the image Pi obtained by projection pattern shooting even in the extraction processing for the stripe structure, the influence due to external light or a difference in surface reflectivity characteristic of the object can be greatly eased.

Then, the processing for specifying a color during emission of the stripe is carried out with respect to the section sandwiched between the edges.

That is, the number of components for which (Fi-Ni) (where i=r, g, b) becomes equal to or above the noise level is checked (step S9).

Here, if the number of components is 0, the three-dimensional shape of that area cannot be estimated (step S10). This is the case where the object is black.

If the number of components for which (Fi-Ni) becomes equal to or above the noise level is 1, a histogram of the estimated pattern transmissivity Ti is created in an area where only one component is reflected (step S11). With respect to this histogram, such a threshold value as that the histogram is divided into a number of gradations when creating the pattern, e.g., three in this embodiment is automatically set by, for example, the judgment analysis technique (step S12). Then, the gradation of the estimated pattern transmissivity Ti is judged by using the threshold value set at the step S12 (step S13). Further, the color during emission of the stripe is specified by the determined gradation of the estimated pattern transmissivity Ti, and the code number is estimated (step S14).

Furthermore, if the number of components for which (Fi-Ni) becomes equal to or above the noise level is two, the estimated pattern transmissivities Ti of the two components are compared with each other in largeness (step S15). Then, the sum of the estimated pattern transmissivities Ti of the two components is calculated, and a histogram of a value of the sum in an area where the two components are reflected is generated (step S16). Subsequently, such a threshold value as that the histogram is divided into two is automatically set by, e.g., the judgment analysis technique (step S17). Thereafter, the gradation of the sum of the estimated pattern transmissivities Ti of the two components is judged by using the set threshold value (step S18). Furthermore, the color at the time of emission of the stripe is specified by using the relationship in largeness between the estimated pattern transmissivities Ti of the two components and the gradation value corresponding to the sum of the estimated pattern transmissivities Ti of the two components, and the code number is estimated (step 19).

Moreover, if the number of components for which (Fi−Ni) becomes equal to or above the noise level is three, the hue is calculated from values of the three components (255*Ti) (step S20), and judgment is made upon which hue in emission the calculated hue is closest to, the color during emission of the stripe is specified, and the code number is estimated (step S21). It is to be noted that, for example, a ratio or the relationship in largeness between the three components may be used instead of specifying a color of the stripe based on the hue.

A string of the code numbers can be estimated by performing this procedure with respect to the pixels in the maximum parallax section, and a result of estimation is written in the image memory 25 as the pattern information extracted by the two-dimensional image information generation portion 26.

Then, in the depth calculation portion 27, a string of the code numbers in the pattern information is compared and collated with the code sequence stored in the pattern memory 21. In this embodiment, the code sequence having the same combination of the chromatic stripes which are adjacent to each other with the black strip therebetween is searched. If there are a plurality of code sequences having the same combination of the chromatic stripes which are adjacent to each other with the black stripe therebetween as that in the string of the estimated code numbers, there is selected a code sequence having a maximum length of the code numbers which continuously match with the string of the estimated code numbers as a most reliable code sequence. By repeating this processing, the decoding processing is terminated, and the one-to-one relationship is determined with respect to the respective stripes of the light projection pattern and the light receiving pattern. At last, a depth value is calculated at each point of the object based on the principle of triangulation.

As described above, according to this embodiment, since a pattern which can estimate a color of the stripe at the time of emission is provided even in case of the object having a high-saturation color, it is possible to obtain the three-dimensional shapes of the objects having a high-saturation color as well as a white-based color or a low-saturation color, thereby easing the restriction concerning the color of the object.

Figure 1:
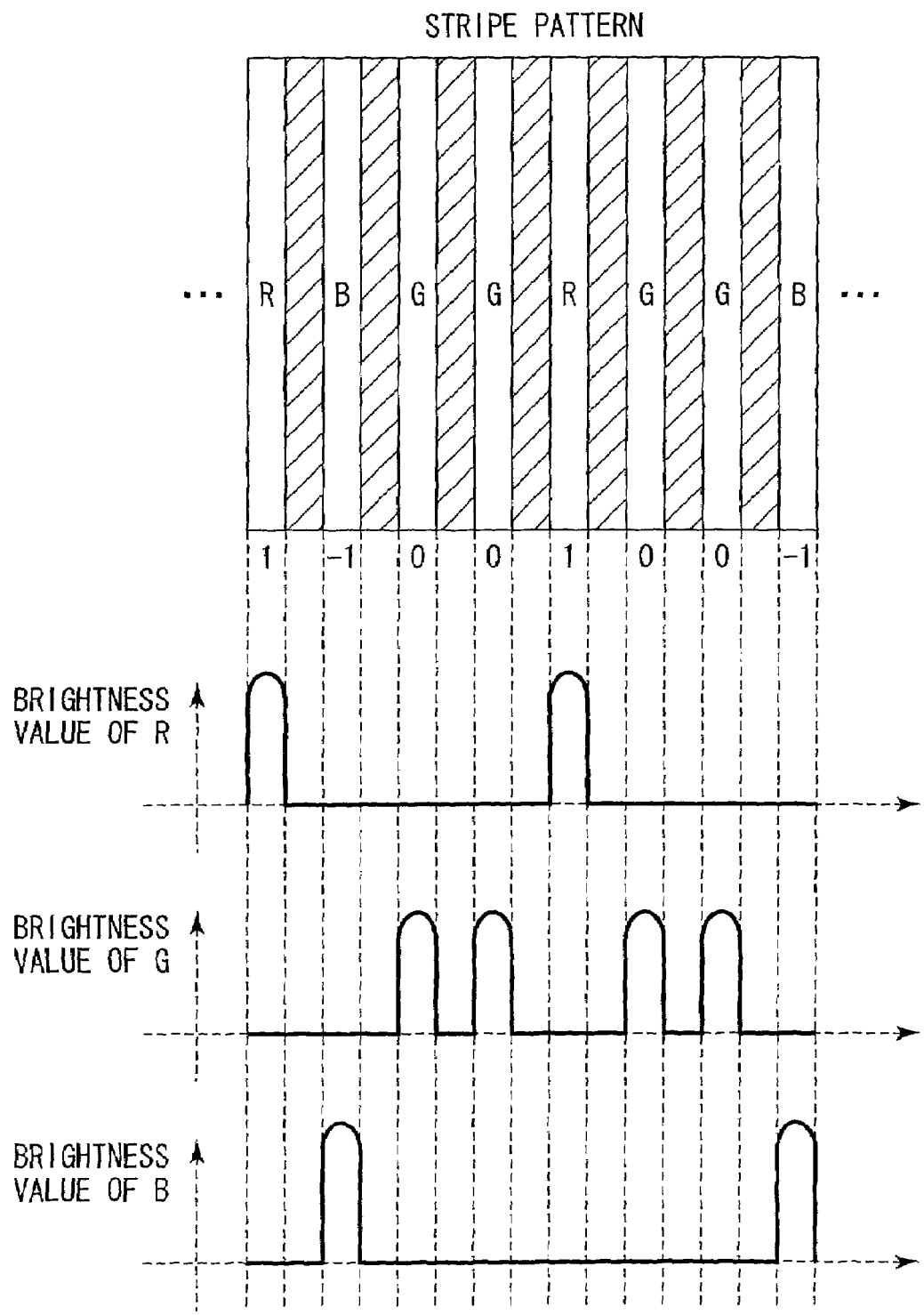
FIG. 1 is a view showing an example of a pattern according to prior art.

That is, in the prior art such as shown in FIG. 1, when the pattern area having no change in intensity of the R component (pattern area having a change in intensity of G or B) is projected onto, e.g., a red object, a change between the stripes cannot be detected, and the three-dimensional shape cannot be obtained from that part. On the contrary, according to this embodiment, since component values of all of R, G and B necessarily vary between the stripes, a change between the stripes can be necessarily detected even if the pattern is projected onto any object having colors other than black, thereby reducing an area where the three-dimensional shape cannot be obtained. Of course, this advantage can be obtained by applying the conventionally known method for detecting a change between the stripes using the coded color pattern 4 such as one in this embodiment, the greater advantage can be demonstrated when combined with the apparatus such as one in this embodiment.

In addition, according to this embodiment, by using three types of images, i.e., an image obtained by the flash shooting with a pattern, an image obtained by flash shooting without a pattern and an image obtained by non-flash shooting without a pattern under the external light with various colors such as a fluorescent lamp or a bulb or with respect to various kinds of objects having different surface reflectivity characteristics, color at the time of emitting the pattern can be accurately determined, thereby reducing an error in three-dimensional measurement.

Additionally, according to this embodiment, since component values of all of R, G and B necessarily vary between the stripes, a change between the stripes can be necessarily detected even if the pattern is projected onto any pattern having colors other than black, thereby reducing an area where the three-dimensional shape cannot be obtained.

Further, according to this embodiment, since sections or areas where component values of all of R, G and B become local maximum and local minimum are alternately arranged, the border between the stripes can be readily detected as compared with the pattern structure which allows an inflection point on the border between the stripes. Furthermore, there is also an advantage of reducing the risk that the border between the stripes is lost due to diffusion of light.

SECOND EMBODIMENT

The second embodiment according to the present invention will now be described. In this second embodiment, the method part is the same as the three-dimensional information acquisition method used in the first embodiment, but the apparatus structure is different.

Figure 6:
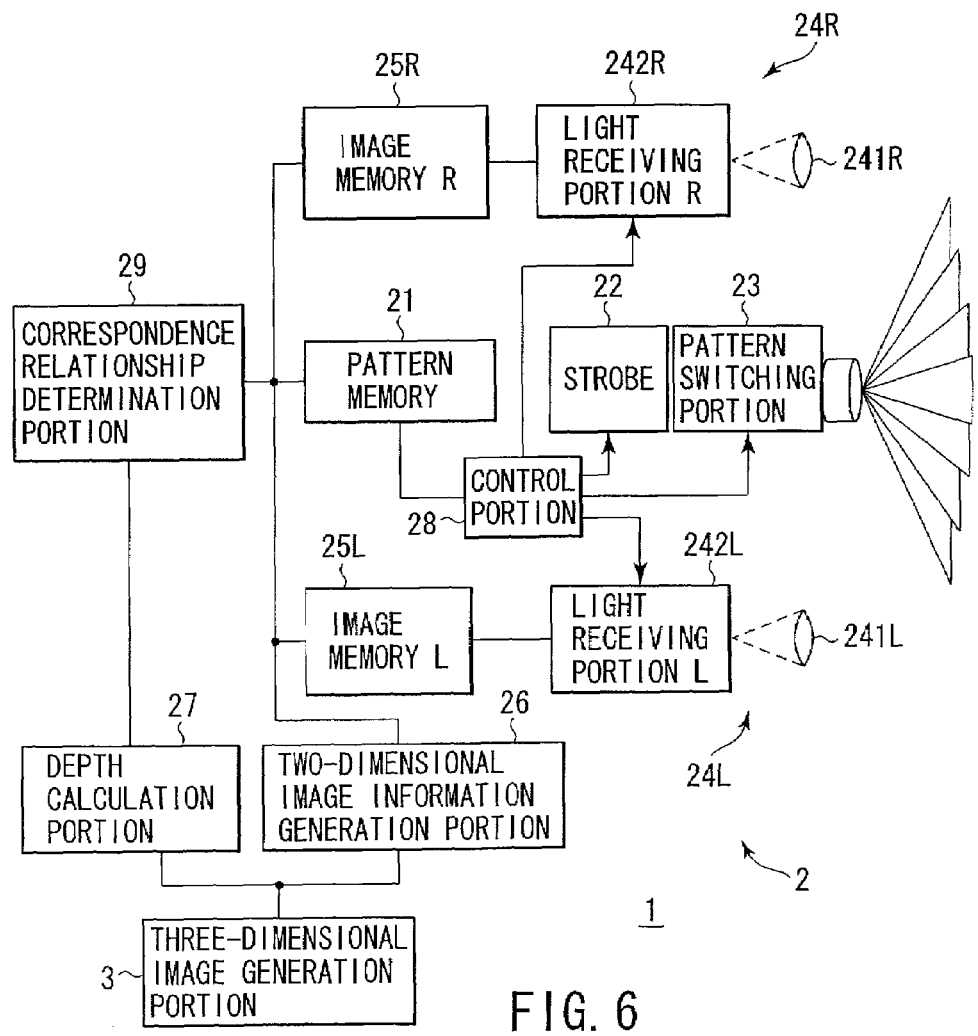
FIG. 6 is a block diagram showing a three-dimensional shape measurement apparatus to which a three-dimensional information acquisition apparatus according to a second embodiment of the present invention is applied.

That is, as shown in FIG. 6, a three-dimensional information acquisition apparatus 2 according to the second embodiment is constituted by a pattern memory 21 which stores therein a pattern to be projected onto an object, a strobe 22 used for emitting light, a pattern switching portion 23 which switches presence/absence of the pattern which modulates the intensity (transmissivity) of the light depending on a position, condenser lenses 241R and 241L which condense the reflected light, light receiving portions 242R and 242L which receives the light condensed by the condenser lenses 241R and 241L, image memories 25R and 25L which store therein a taken image, a two-dimensional image information generation portion 26 which generates two-dimensional image information from the image stored in the image memories 25R and 25L, a correspondence relationship determination portion 29 which determines the correspondences between the images stored in the image memories 25R and 25L and the pattern stored in the pattern memory 21, a depth calculation portion 27 which calculates a depth value from the correspondence relationship determined by the correspondence relationships determination portion 29 by using the principle of triangulation, and a control portion 28 which controls the strobe 22, the pattern switching portion 23 and the light receiving portions 242R and 242L.

Furthermore, the three-dimensional image generation portion 3 constituting the three-dimensional shape measurement apparatus 1 together with the three-dimensional information acquisition apparatus 2 generates a three-dimensional image from the two-dimensional image information stored in the two-dimensional image information generation portion 26 and the depth value calculated by the depth calculation portion 27.

Description will now be given as to the operation of such a three-dimensional image acquisition apparatus 2 according to the second embodiment.

The control portion 28 first causes the strobe 22 to emit the light, modulates the light in the pattern switching portion 23 and projects a pattern onto an object (not shown). This projected image is condensed by the condenser lenses 241R and 241L arranged at two different positions, e.g., on the right and left sides of the strobe 22 and the pattern switching portion 23. Then, the condensed light is respectively received by the light receiving portions 242R and 242L and stored in the image memories 25R and 25L. An image obtained by the flash shooting without a pattern and an image obtained by the non-flash shooting without a pattern are similarly stored in the image memories 25R and 25L, respectively. A difference from the first embodiment is that the three types of images are written in the image memories provided at the two positions with different view points.

Subsequently, as similar to the first embodiment, estimated pattern information at the time of emission is calculated from the three images with respect to both the right and the left in the two-dimensional information generation portion 26, and it is written in the image memories 25R and 25L.

Then, the correspondence relationship determination portion 29 performs four types of association, i.e., the pattern information stored in the pattern memory 21 and the right estimated pattern information written in the image memory 25R, the pattern information stored in the pattern memory 21 and the left estimated pattern information written in the image memory 25L, the pattern information written in the right image memory 25R and the estimated pattern information of the pattern information written in the left image memory 25L, and images obtained by the flash shooting without a pattern which are received by the right light receiving portion 242R and the left light receiving portion 242L.

At this moment, difficulty in association with an area without a texture, which is a problem in the passive stereo method, is considerably reduced.

Moreover, in the first embodiment, although the correspondence relationship between the projected pattern and the taken pattern is a clue to calculate the depth value, the correspondence relationship between the right and left images with and without a pattern can be used in this embodiment, thereby realizing highly reliable association.

As described above, according to the second embodiment, since a pattern projected image is obtained by the image pickup elements positioned at two or more view points and association between a plurality of images is carried out as well as association between the projected pattern and the taken pattern, more accurate association is enabled, thereby improving the measurement accuracy and the reliability.

THIRD EMBODIMENT

A third embodiment according to the present invention will now be described.

The apparatus structure according to the third embodiment is similar to that according to the first embodiment or the second embodiment. A difference lies in that the influence of the external light is suppressed by shooting with a high-speed shutter (for example, 1/500 second). As a result, non-flash shooting without a pattern can be eliminated, and fetching the image can be thereby completed by the two times of shooting, i.e., the projection pattern shooting and the flash shooting without a pattern.

Figure 7:
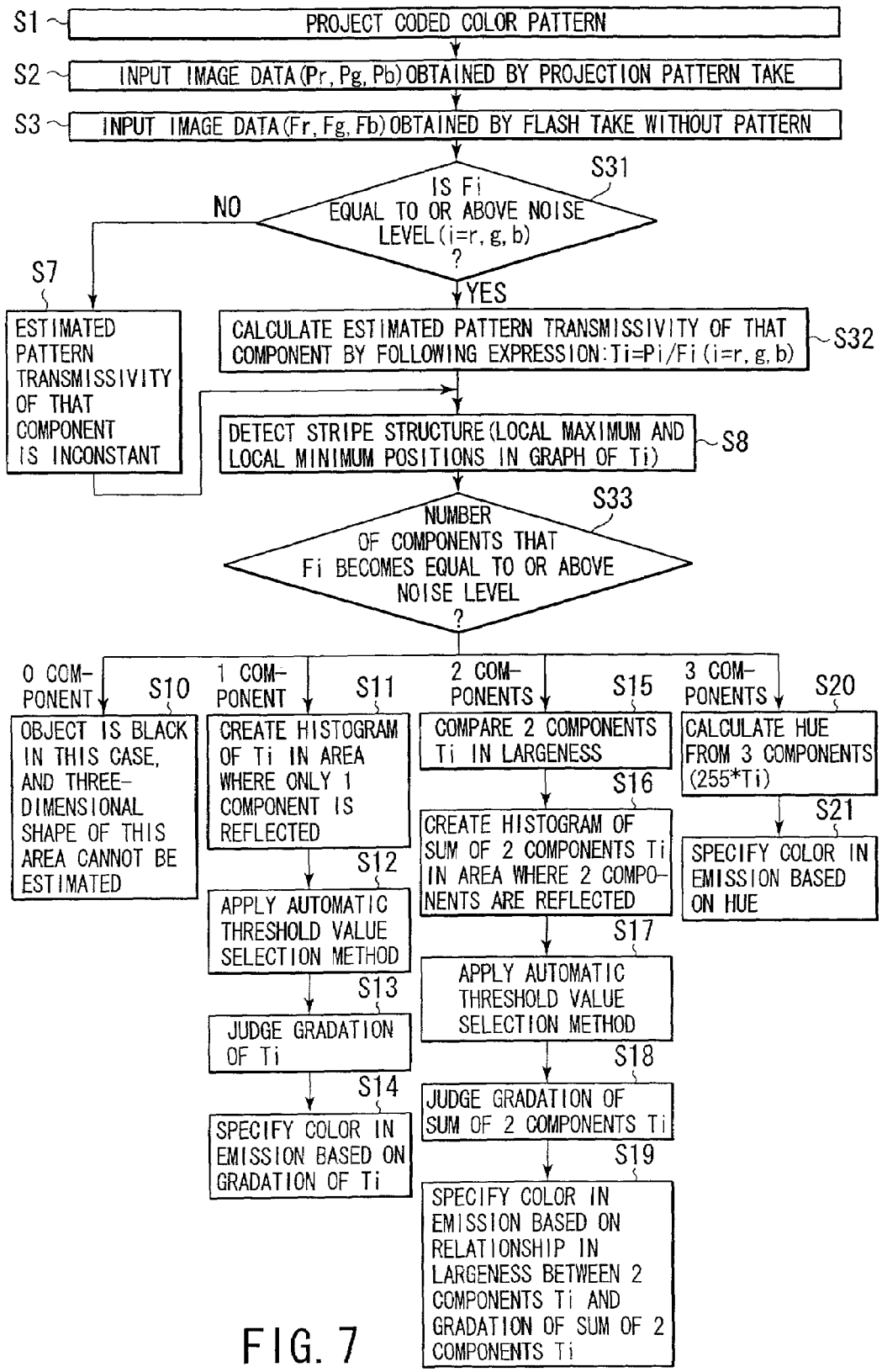
FIG. 7 is a view showing a flowchart for illustrating a flow until a color at the time of emission is specified in image processing according to a third embodiment of the present invention.

Based on this, the flow of processing becomes slightly simpler than that of the first embodiment or the like. This will now be described with reference to FIG. 7.

The coded color pattern 4 is first projected onto the object (step S1). Then, the projected pattern is shot with the high-speed shutter, and the obtained image data (Pr, Pg and Pb) is input to the image memory 25 (step S2).

Subsequently, the flash shooting without a pattern is performed with the high-speed shutter, and the obtained image data (Fr, Fg and Fb) is input to the image memory 25 (step S3). A series of the processing from the step S1 to the step S3 is instantaneously performed, and input of the necessary information is completed.

Thereafter, in the two-dimensional image information generation portion 26, the stripe structure of the pattern is extracted from the information input to the image memory 25, a color at the time of emission of the stripe is specified with respect to each stripe, and decoding processing is carried out. Each of such processing will now be described in detail hereinafter.

At first, the influence due to external light or a difference in surface reflectivity characteristic of the object is eliminated, and processing for estimating a pattern at the time of emission is carried out. Here, the relational expression required for this processing will now be described with reference to FIG. 5. As shown in FIG. 5, assuming that the intensity of light projection is L, the transmissivity of the pattern is T, the surface reflectivity of the object is R and the intensity of the external light is S, they are considered as functions of respective pixels of the received image. Here, approximately considering that a light ray emitted from the pattern switching portion 23 and a light ray entering the light receiving portion 242 can be described in the one-to-one relationship ignoring the diffusion of light or the like, the following description is possible:

$$P=R(TL+S)$$

$$F=R(L+S)$$

where P is pixel intensity of an image obtained by the projection pattern shooting and F is pixel intensity of an image obtained by the flash shooting. In the third embodiment, since the shooting is carried out by using the high-speed shutter, S can be approximately regarded as 0. At this moment, when these two expressions are simultaneously realized and T is solved, the following can be established:

$$T=P/F$$

For example, when pixel intensity values are obtained with respect to three components of R, G and B, by approximately considering that R, G and B are independent from each other, the estimated pattern transmissivities Tr, Tg and Tb relative to R, G and B can be obtained by the following expressions:

$$Tr=Pr/Fr$$

$$Tg=Pg/Fg$$

$$Tb=Pb/Fb$$

However, in order to cope with the influence of noise or the like, when the denominator is close to zero, consideration must be given eliminating that component.

Again referring to FIG. 7, judgment is made upon whether the denominator in the above expression, i.e., Fi (where i=r, g and b) is equal to or above a preset noise level (step S31). If it is equal to or above this noise level, the estimated pattern transmissivity Ti of that component is calculated by using the above expressions (step S32). On the contrary, if it is less than the noise level, the estimated pattern transmissivity of that component is determined as being inconstant, and a value which does not affect the subsequent processing is input (step S7).

Subsequently, the stripe structure of the pattern (local maximum and local minimum positions in the graph of Ti) is detected (step S8). In order to detect the stripe structure, edge portions of the stripe are extracted by using, e.g., a Sobel filter, and judgment is made upon whether the intensity of Ti becomes local maximum or local minimum in a section sandwiched between the edges. Since the estimated pattern transmissivity Ti is used in place of an image Pi obtained by the projection pattern shooting even in this stripe structure extracting processing, the influence of the external light or a difference in surface reflectivity characteristic of the object can be greatly reduced, thereby stably extracting the stripe.

Thereafter, the processing for specifying a color at the time of emission of the stripe is carried out with respect to the section sandwiched between the edges.

That is, the number of components for which Fi (where i=r, g and b) is equal to or above the noise level is first checked (step S33).

Here, if the number of components is 0, the three-dimensional shape of that area cannot be estimated (step S10). This is the case of a black object.

If the number of components for which Fi is equal to or above the noise level is 1, a histogram of the estimated pattern transmissivity Ti is created in an area where only one component is reflected (step S11). With respect to this histogram, such a threshold value as that the histogram is divided into a number of gradations at the time of creating the pattern is automatically set by, e.g., the judgment analysis technique (step S12). Then, a threshold value set at the step S12 is used to judge the gradation of the estimated pattern transmissivity Ti (step S13). Then, the color at the time of emitting the stripe is specified by using the judged gradation of the estimated pattern transmissivity Ti, and the code number is estimated (step S14).

Further, if the number of components for which Fi is equal to or above the noise level is two, the estimated pattern transmissivities Ti of the two components are compared in largeness (step S15). Then, the sum of the estimated pattern transmissivities Ti of the two components is calculated, and a histogram of a value of the sum in an area where the two components are reflected is created (step S16). Then, such a threshold value as that the histogram is divided into two is automatically set by, e.g., the judgment analysis technique (step S17). Thereafter, the gradation of the sum of the estimated pattern transmissivities Ti of the two components is judged by using this set threshold value (step S18). Further, the color at the time of emitting the stripe is specified by using the relationship in largeness between the estimated pattern transmissivities Ti of the two components and a gradation value corresponding to the sum of the estimated pattern transmissivities Ti of the two components, and the code number is estimated (step S19).

Furthermore, if the number of components for which Fi is equal to or above the noise level is three, a hue is calculated from a value of the three components (255*Ti) (step S20), judgment is made upon which hue at the time of emission the calculated hue is closest to, the color at the time of emitting the stripe is specified, and the code number is estimated (step S21). It is to be noted that a ratio or the relationship in largeness between three components may be used instead of specifying a color of the stripe by using the hue.

A code number string is estimated by carrying out this procedure with respect to pixels in a section having the maximum parallax, and a result of this estimation is written in the image memory 25 as the pattern information extracted by the two-dimensional image information generation portion 26.

Moreover, the subsequent processing for calculating the depth in the depth calculation portion 27 after collating the code number string in the pattern information with the code sequence stored in the pattern memory 21 is the same as that in the first embodiment.

FOURTH EMBODIMENT

A fourth embodiment according to the present invention will now be described.

In the fourth embodiment, the apparatus structure is slightly different from the first embodiment.

Figure 8:
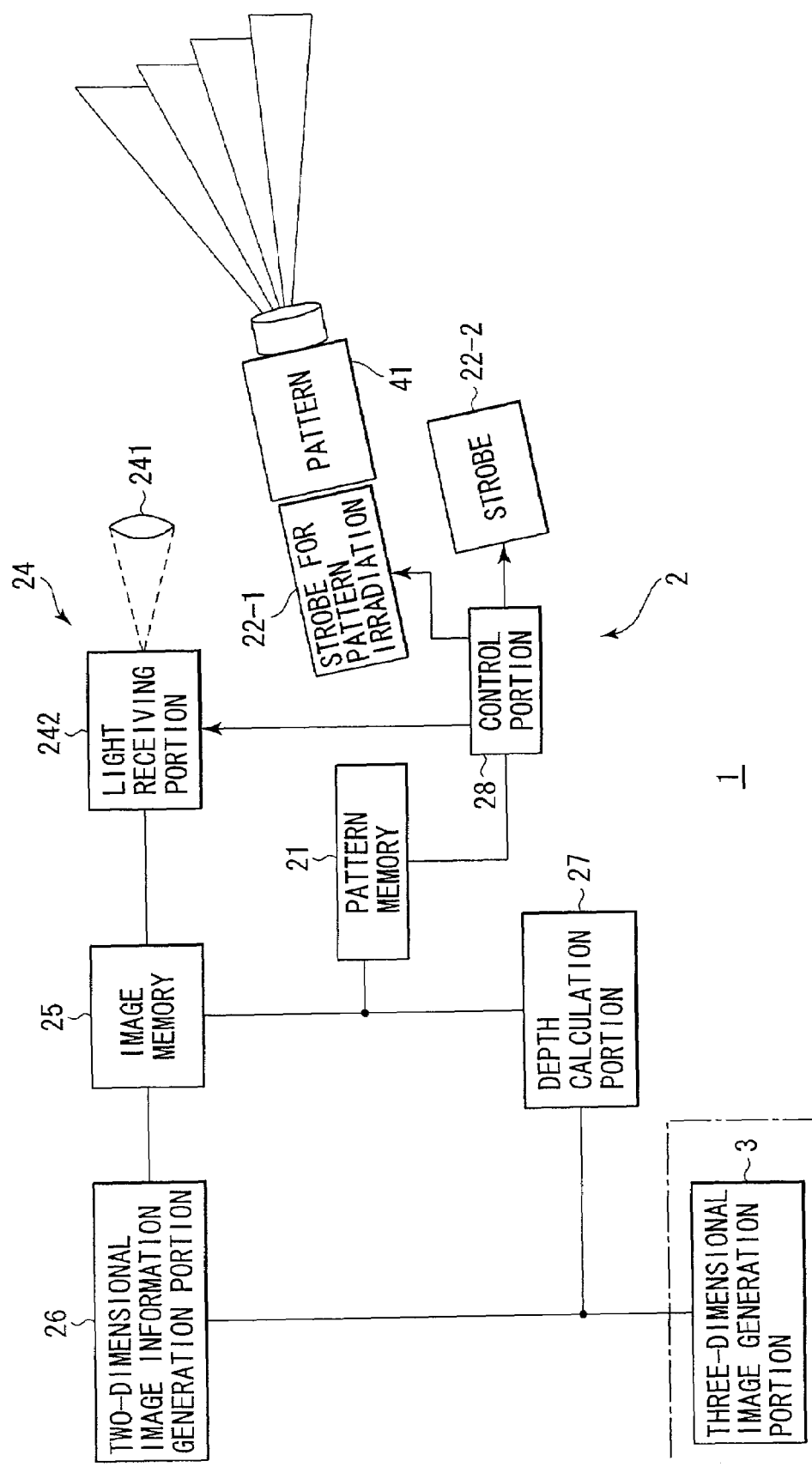
FIG. 8 is a block diagram of a three-dimensional shape measurement apparatus to which a three-dimensional information acquisition apparatus according to a fourth embodiment of the present invention is applied.

That is, as shown in FIG. 8, the fourth embodiment includes a pattern irradiation strobe 22-1, a fixed pattern 41 provided on a film arranged on the front face of the pattern irradiation strobe 22-1, and a strobe 22-2 in place of the strobe 22 and the pattern switching portion 23 in the first embodiment. Here, the control portion 28 controls the pattern irradiation strobe 22-1 to emit the light at the time of the above-described projection pattern shooting and controls the strobe 22-2 to emit the light at the time of the flash shooting without a pattern.

In the fourth embodiment having such a structure, since there is no movable portion like the pattern switching portion 23 in the first embodiment, there are merits that the apparatus is hard to destroy or power consumption is small, for example.

However, the irradiation condition of the pattern irradiation strobe 22-1 and that of the strobe 22-2 must be substantially the same. That is, it is desirable to set strobes having similar light emission characteristics are set at positions close to each other and flash irradiation directions are set to be equal.

Incidentally, the flow of processing is similar to that of the first embodiment or the third embodiment utilizing the high-speed shutter shooting.

FIFTH EMBODIMENT

A fifth embodiment according to the present invention will now be described.

The apparatus structure in the fifth embodiment is similar to that in the first embodiment or the second embodiment. Differences are that the influence of the external light is suppressed by performing the shooting by using the high-speed shutter and that an object having a substantially homogeneous and uniform color such as an apple is presumed as a target of three-dimensional measurement.

In this case, the non-flash shooting without a pattern and the flash shooting without a pattern are eliminated, and fetching an image is completed by only one projection pattern shooting.

Figure 9:
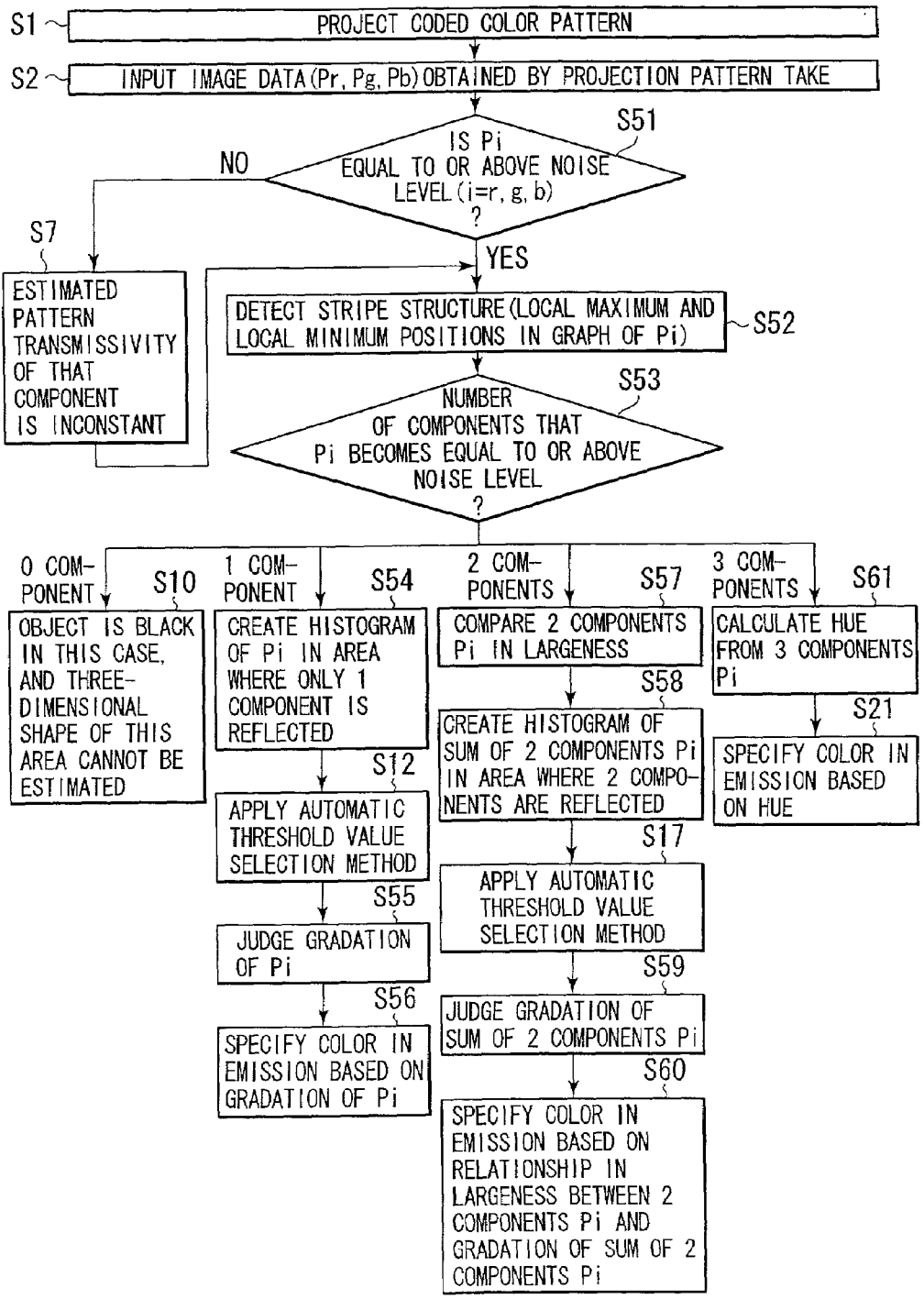
FIG. 9 is a view showing a flowchart for illustrating a flow until a color at the time of emission is specified in image processing according to a fifth embodiment of the present invention.

Based on this, the flow of processing is further simplified as compared with the first embodiment and others. This will be described with reference to FIG. 9.

The coded color pattern 4 is first projected onto the object (step S1). Then, the projected pattern is shot by using the high-speed shutter, and the obtained image data (Pr, Pg and Pb) is input to the image memory 25 (step S2).

Thereafter, in the two-dimensional image information generation portion 26, the stripe structure of the pattern is extracted from the information input to the image memory 25, a color at the time of emitting the stripe is specified with respect to each stripe, and decoding processing is carried out. Each of such processing will now be described in detail hereinafter.

That is, judgment is first made upon whether Pi (where i=r, g and b) is equal to or above a preset noise level (step S51). If it is less than the nose level, the estimated pattern transmissivity of that component is determined as being inconstant, and a value which does not affect the subsequent processing is input (step S7).

In addition, if it is equal to or above the noise level, the stripe structure of the pattern (local maximum and local minimum positions in the graph of Pi) is detected (step S52). In order to detect the stripe structure, edge portions of the stripe are extracted by using, e.g., a Sobel filter, and judgment is made upon whether the intensity of Pi becomes local maximum or local minimum in a section sandwiched between the edges.

Subsequently, there is carried out processing for specifying the color at the time of emitting the stripe with respect to the section sandwiched between the edges.

That is, the number of components for which Pi (where i=r, g and b) becomes equal to or above the noise level is checked (step S53).

Here, if the number of components is zero, the three-dimensional shape of that area cannot be estimated (step S10). This is the case of a black object.

If the number of components for which Pi becomes equal to or above the noise level is one, a histogram of the estimated pattern transmissivity Pi in an area where only one component is reflected is created (step S54). With respect to this histogram, such a threshold value as that the histogram is divided into a number of gradations at the time of creating the pattern is automatically set by, e.g., the judgment analysis technique (step S12). Then, the gradation of the estimated pattern transmissivity Pi is judged by using the threshold value set at the step S12 (step S55). Then, the color at the time of emitting the stripe is specified by using the judged gradation of the estimated pattern transmissivity Pi, and the code number is estimated (step S56).

Additionally, if the number of components for which Pi becomes equal to or above the noise level is two, the estimated pattern transmissivities Pi of the two components are compared with each other in largeness (step S57). Subsequently, the sum of the estimated pattern transmissivities Pi of the two components is calculated, and a histogram of a value of the sum in an area where the two components are reflected is created (step S58). Then, such a threshold value as that the histogram is divided into two is automatically set by, e.g., the judgment analysis technique (step S17). Thereafter, this set threshold value is used to judge the gradation of the sum of the estimated pattern transmissivities Pi of the two components (step S59). Then, the color at the time of emitting the stripe is specified by using the relationship in largeness between the estimated pattern transmissivities Pi of the two components and the gradation value corresponding to the sum of the estimated pattern transmissivities Pi of the two components, and the code number is estimated (step S60).

Further, if the number of components for which Pi becomes equal to or above the noise level is three, a hue is calculated from values of Pi of the three components (step S61), judgment is made upon which hue at the time of emission the calculated hue is closest to, the color at the time of emitting the stripe is specified, and the code number is estimated (step S21). It is to be noted that a ratio or the relationship in largeness between three components may be used in place of specifying the color of the stripe by using the hue.

The code number string is estimated by carrying out this procedure with respect to pixels in a section having the maximum parallax, and a result of this estimation is written in the image memory 25 as the pattern information extracted in the two-dimensional image information generation portion 26.

Furthermore, the subsequent processing for calculating the depth in the depth calculation portion 27 after collating the code number string in this pattern information with the code sequence stored in the pattern memory 21 is the same as that in the first embodiment.

As described above, according to the present invention, there is used the projection pattern having two different characteristics, i.e., the characteristic based on a color which is used for measuring an object having a white-based color or a low-saturation color and the characteristic based on the gradation of the same color component which is used for measuring an object having a high-saturation color, and correction of the reflectivity and the external light is performed from three types of images, i.e., an image obtained by the projection pattern shooting, an image obtained by the flash shooting and an object obtained by the non-flash shooting. Then, the pattern is specified, and thereby a depth value is calculated. Therefore, the three-dimensional information can be obtained in an object having a high-saturation color as well as an object having a low-saturation color.

Moreover, according to the present invention, there is carried out coding having both characterization of the stripe based on a color (combination of component values) and characterization based on the gradation of the same component simultaneously included in one pattern, and an object having a white-based color or a low-saturation color is decoded by using the characteristic based on the color while an object having a high-saturation color is decoded by using the characteristic based on the gradation of the reflected component value less than the noise level. Therefore, a position in the light projection pattern and a position in the light reception pattern can be assuredly associated with objects having various kinds of colors including high-saturation colors. As a result, there can be obtained an advantage that the three-dimensional shape can be further accurately measured with respect to objects having various kinds of colors.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A three-dimensional information acquisition apparatus which shoots, with a shooting unit, a shooting object on which a predetermined projection pattern, in which patterns of a plurality of color components overlap, is projected at a position a predetermined distance away from the shooting unit, and which analyses an image shot by said shooting unit, thereby obtaining three-dimensional information of said shooting object, said apparatus comprising:
- an image memory which receives from said shooting unit and stores therein: a first image obtained by shooting said shooting object illuminated with light from a light source, a second image obtained by shooting said shooting object without performing illumination with the light from said light source by one of turning off said light source and preventing transmission of the light from said light source, and a third image obtained by shooting said shooting object on which said projection pattern is projected by utilizing one of the light from said light source and light from any other light source having a same characteristic as a characteristic of said light source;
- a pattern memory which stores therein said projection pattern to be projected onto said shooting object in advance;
- a pattern structure estimation portion which corrects influence of a surface reflectivity of said shooting object and external light by utilizinq said first, second and third images stored in said image memory, and which estimates a structure of said shot pattern based on at least one of a color and a gradation of each portion of said pattern obtained by performing said correction; and
- a depth calculation portion which specifies a correspondence relationship between a result of said estimation obtained by said pattern structure estimation portion and said projection pattern stored in said pattern memory, and which calculates a depth value of said shooting object based on a result of specification of said correspondence relationship.

2. An apparatus according to claim 1, wherein a pattern of each color component in said projection pattern is obtained by arranging a plurality of areas in such a manner that adjacent areas have different gradations.

3. An apparatus according to claim 1, wherein a pattern of each color component in said projection pattern is obtained by alternately arranging an area where a gradation becomes a local maximum and an area where a gradation becomes a local minimum.

4. An apparatus according to claim 3, wherein said area where a gradation becomes a local minimum is on a minimum gradation level.

5. An apparatus according to claim 1, wherein said projection pattern includes a plurality of areas having different chromatic colors, and
- wherein said areas having chromatic colors in said projection pattern comprise combinations of areas each having a predetermined gradation of a pattern of said each color component, wherein a gradation of an arbitrary area in a pattern of one color component is different from a gradation of an arbitrary area in a pattern of another color component, and wherein said projection pattern is thereby encoded so as to be capable of specifying an area in said projection pattern to which said arbitrary area corresponds.

6. An apparatus according to claim 1, wherein a plurality of said color components are three components of R, G and B.

7. An apparatus according to claim 1, wherein said pattern structure estimation portion selectively executes a first estimation method which estimates a structure of said shot pattern based on a color of said shot pattern, and a second estimation method which estimates a structure of said shot pattern based on a gradation of at least one color component which is not all the color components, and
- wherein said depth calculation portion calculates a depth value of said shooting object by utilizing a result of estimation obtained by one of said first and second estimation methods.

8. A three-dimensional information acquisition apparatus which shoots, with a shooting unit, a shooting object on which a predetermined projection pattern, in which patterns of a plurality of color components overlap, is projected at a position a predetermined distance away from the shooting unit, and which analyses an image shot by said shooting unit, thereby obtaining three-dimensional information of said shooting object, said apparatus comprising:
- an image memory which receives from said shooting unit and stores therein; a first image obtained by shooting said shooting object illuminated with light from a light source and a second image obtained by shooting said shooting object on which said projection pattern is projected by utilizing one of the light from said light source and light from any other light source having a same characteristic as a characteristic of said light source;
- a pattern memory which stores said projection pattern projected on said shooting object in advance;
- a pattern structure estimation portion which corrects an influence of a surface reflectivity of said shooting object by utilizing said first and second images stored in said image memory, and which estimates a structure of a shot pattern based on at least one of a color and a gradation of each portion of said pattern obtained by performing said correction; and
- a depth calculation portion which specifies a correspondence relationship between a result of said estimation obtained by said pattern structure estimation portion and said projection pattern stored in said pattern memory, and which calculates a depth value of said shooting object by utilizing a result of specification of said correspondence relationship.

9. An apparatus according to claim 8, wherein a pattern of each color component in said projection pattern is obtained by arranging a plurality of areas in such a manner that adjacent areas have different gradations.

10. An apparatus according to claim 8, wherein a pattern of each color component in said projection pattern is obtained by alternately arranging an area where a gradation becomes a local maximum and an area where a gradation becomes a local minimum.

11. An apparatus according to claim 10, wherein said area where a gradation becomes a local minimum is on a minimum gradation level.

12. An apparatus according to claim 8, wherein said projection pattern includes a plurality of areas having different chromatic colors, and
- wherein said areas having chromatic colors in said projection patterns comprise combinations of areas each having a predetermined gradation of a pattern of said each color component, wherein a gradation of an arbitrary area in a pattern of one color component is different from a gradation of an arbitrary area in a pattern of another color component, and wherein said projection pattern is thereby encoded so as to be capable of specifying an area in said projection pattern to which said arbitrary area corresponds.

13. An apparatus according to claim 8, wherein a plurality of said color components are three components of R, G and B.

14. An apparatus according to claim 8, wherein said pattern structure estimation portion selectively executes a first estimation method which estimates a structure of said shot pattern based on a color of said shot pattern, and a second estimation method which estimates a structure of said shot pattern based on a gradation of at least one color component which is not all the color components, and
 wherein said depth calculation portion calculates a depth value of said shooting object by utilizing a result of estimation obtained by one of said first and second estimation methods.

15. A three-dimensional information acquisition apparatus which shoots, with a shooting unit, a shooting object on which a predetermined projection pattern, in which patterns of a plurality of color components overlap, is projected at a position a predetermined distance away from the shooting unit, and which analyses an image shot by said shooting unit, thereby obtaining three-dimensional information of said shooting object, said apparatus comprising:
 an image memory which receives and stores therein an image obtained by shooting said shooting object on which said projection pattern is projected from said shooting unit;
 a pattern memory which stores therein said projection pattern to be projected on said shooting object in advance;
 a pattern structure estimation portion which selectively executes a first estimation method which estimates a structure of said shot pattern based on a color of said shot pattern included in said image, and a second estimation method which estimates a structure of said shot pattern based on a gradation of at least one color component which is not all color components; and
 a depth calculation portion which specifies a correspondence relationship between a result of estimation obtained by one of said first and second estimation methods in said pattern structure estimation portion and said projection pattern stored in said pattern memory, and which calculates a depth value of said shooting object by utilizing a result of specifying said correspondence relationship.

16. An apparatus according to claim 15, wherein a pattern of each color component in said projection pattern is obtained by arranging a plurality of areas in such a manner that adjacent areas have different gradations.

17. An apparatus according to claim 15, wherein a pattern of each color in said projection pattern is obtained by alternately arranging an area where a gradation becomes a local maximum and an area where a gradation becomes a local minimum.

18. An apparatus according to claim 17, wherein said area where a gradation becomes a local minimum is on a minimum gradation level.

19. An apparatus according to claim 15, wherein said projection pattern includes a plurality of areas having different chromatic colors, and
 wherein said areas having chromatic colors in said projection pattern comprise combinations of areas each having a predetermined gradation of a pattern of said each color component, wherein a gradation of an arbitrary area in a pattern of one color component is different from a gradation of an arbitrary area in a pattern of another color component, and wherein said projection pattern is thereby encoded so as to be capable of specifying an area in said projection pattern to which said arbitrary area corresponds.

20. An apparatus according to claim 15, wherein a plurality of said color components are three components of R, G and B.

21. A three-dimensional information acquisition method wherein a shooting unit is used to shoot a shooting object on which a predetermined projection pattern, in which patterns of a plurality of color components overlap, is projected at a position a predetermined distance away from said shooting unit, and wherein an image shot by said shooting unit is analysed, thereby acquiring three-dimensional information of said shooting object, said method comprising:
 obtaining a first image by shooting said shooting object illuminated with light from a light source;
 obtaining a second image by shooting said shooting object without performing illumination using the light from said light source by one of turning off said light source and preventing transmission of the light from said light source;
 obtaining a third image by shooting said shooting object on which said projection pattern is projected by utilizing one of the light from said light source and light from any other light source having a same characteristic as a characteristic of said light source;
 correcting influence of a surface reflectivity of said shooting object and external light by utilizing said first, second and third images, and estimating a structure of a shot pattern based on at least one of a color and a gradation of each portion of said pattern obtained by performing said correction;
 specifying a correspondence relationship between a result of said estimation and said projected predetermined projection pattern; and
 calculating a depth value of said shooting object based on a result of specifying said correspondence relationship.

22. A three-dimensional information acquisition method wherein a shooting unit is used to shoot a shooting object on which a predetermined projection pattern, in which patterns of a plurality of color components overlap, is projected at a position a predetermined distance away from said shooting unit, and wherein an image shot by said shooting unit is analysed, thereby acquiring three-dimensional information of said shooting object, said method comprising:
 obtaining a first image by shooting said shooting object illuminated with light from a light source;
 obtaining a second image by shooting said shooting object on which said projection pattern is projected by utilizing one of the light from said light source and light from any other light source having a same characteristic as a characteristic of said light source;
 correcting influence of a surface reflectivity of said shooting object by utilizing said first and second images, and estimating a structure of a shot pattern based on at least one of a color and a gradation of each portion in said pattern obtained by performing said correction;
 specifying the a correspondence relationship between a result of said estimation and said projected predetermined projection pattern; and
 calculating a depth value of said shooting object by utilizing a result of specifying said correspondence relationship.

23. A three-dimensional information acquisition method wherein a shooting unit is used to shoot a shooting object on which a predetermined projection pattern, in which patterns of a plurality of color components overlap, is projected at a position a predetermined distance away from said shooting unit, and wherein an image shot by said shooting unit is analysed, thereby acquiring three-dimensional information of said shooting object, said method comprising:

obtaining an image by shooting said shooting object on which said projection pattern is projected;

selectively executing a first estimation method which estimates a structure of a shot pattern based on a color of said shot pattern included in said image and a second estimation method which estimates a structure of said shot pattern based on a gradation of at least one color component which is not all color components;

specifying a correspondence relationship between a result of estimation by one of said first and second estimation methods and said projected predetermined projection pattern; and calculating a depth value of said shooting object by utilizing a result of specifying said correspondence relationship.

* * * * *